US007894217B2

(12) United States Patent
Yan et al.

(10) Patent No.: US 7,894,217 B2
(45) Date of Patent: Feb. 22, 2011

(54) DC TO DC CONVERTER

(75) Inventors: Huai-Zhu Yan, Shenzhen (CN); Tong Zhou, Shenzhen (CN)

(73) Assignees: Innocom Technology (Shenzhen) Co., Ltd., Shenzhen, Guangdong Province (CN); Chimel Innolux Corporation, Miao-Li County (TW)

( * ) Notice: Subject to any disclaimer, the term of this patent is extended or adjusted under 35 U.S.C. 154(b) by 264 days.

(21) Appl. No.: 12/231,484

(22) Filed: Sep. 2, 2008

(65) Prior Publication Data

US 2009/0059624 A1    Mar. 5, 2009

(30) Foreign Application Priority Data

Aug. 31, 2007   (CN) .......................... 2007 1 0076748

(51) Int. Cl.
*H02M 3/335*   (2006.01)
*H02M 7/217*   (2006.01)

(52) U.S. Cl. ........................ 363/21.14; 363/89; 363/127

(58) Field of Classification Search .............. 363/21.12, 363/21.14, 21.16, 89, 127

See application file for complete search history.

(56) References Cited

U.S. PATENT DOCUMENTS

| 5,138,543 | A | 8/1992 | Harm et al. |
| 6,788,555 | B2 * | 9/2004 | Bourdillon et al. ........ 363/21.14 |
| 7,440,298 | B2 * | 10/2008 | Yang .......................... 363/89 |
| 2006/0018135 | A1 | 1/2006 | Yang et al. |

FOREIGN PATENT DOCUMENTS

| CN | 1220324 C | 9/2005 |
| CN | 1286260 C | 11/2006 |

* cited by examiner

*Primary Examiner*—Gary L Laxton
(74) *Attorney, Agent, or Firm*—Wei Te Chung

(57) ABSTRACT

An exemplary direct current (DC) to DC converter includes a first rectifying and filtering circuit configured to receive an alternating current (AC) voltage and transform the AC voltage to a first DC voltage, a pulse width modulation (PWM) circuit, a first transformer configured to receive the first DC voltage and transform the first DC voltage to a second AC voltage under control of the PWM circuit, and a second rectifying and filtering circuit including a first transistor and a control circuit for switching on or switching off the first transistor so as to transform the second AC voltage to a second DC voltage.

18 Claims, 3 Drawing Sheets

DC TO DC CONVERTER

FIELD OF THE INVENTION

The present disclosure relates to power conversion, and more particularly to direct current (DC) to DC converters.

GENERAL BACKGROUND

DC to DC converters are frequently employed to convert relatively low voltage DC sources into high voltage DC sources. The high voltage DC sources are then suitable for application to a DC load, such as electrodes of an electron tube or other electrical devices.

Referring to FIG. 3, one such DC to DC converter 10 includes a first rectifying and filtering circuit 11, a protecting circuit 13, a transformer 14, a second rectifying and filtering circuit 12, a pulse width modulation (PWM) circuit 15, a rectifying diode 16, and a transistor 19. The transistor 19 is a p-channel metal-oxide-semiconductor field-effect transistor (P-MOSFET).

The PWM circuit 15 includes a voltage input 151 configured to receive an operation voltage and a pulse output 152 configured to provide a pulse signal to a gate electrode of the transistor 19.

The first rectifying and filtering circuit 11 includes two inputs 111, 112 configured to receive an external alternating current (AC) voltage such as a 220V AC voltage, a full-bridge rectifying circuit 110 configured to convert the 220V AC voltage to a first direct current (DC) voltage, a filter capacitor 114 configured to stabilize the first DC voltage, and a first output 113 configured to provide the first DC voltage to the transformer 14. Two inputs of the full-bridge rectifying circuit 110 serve as the two inputs 111, 112. A positive output of the full-bridge rectifying circuit 110 serves as the first output 113. A negative output of the full-bridge rectifying circuit 110 is grounded. The filter capacitor 114 is connected between the first output 113 and ground.

The transformer 14 includes a primary winding 141, an assistant winding 142, and a secondary winding 143. The first output 113 of the first rectifying and filtering circuit 11 is connected to ground via the primary winding 141, a drain electrode and a source electrode of the transistor 19, and a resistor 190 in series. The gate electrode of the transistor 19 is connected to the pulse output 152 of the PWM circuit 15. The protecting circuit 13 is connected in parallel with the primary winding 141.

One terminal of the assistant winding 142 is connected to ground. The other terminal of the assistant winding 142 is connected to the voltage input 151 of the PWM circuit 15 via the anode and the cathode of the rectifying diode 16 in serials.

The second rectifying and filtering circuit 12 includes a second rectifying diode 124. The secondary winding 143 is coupled to a second output 163 via the second rectifying and filtering circuit 12 for providing a second DC voltage to a load circuit (not shown) through the second output 163.

The external AC voltage is provided to the two inputs 111, 112 of the first rectifying and filtering circuit 11 and is transformed into the first DC voltage by the first rectifying and filtering circuit 11. Then the first DC voltage is provided to the primary winding 141. The assistant winding 142 induces the primary winding 141, generates an operation voltage, and provides the operation voltage to the voltage input 151 of the PWM circuit 15 via the rectifying diode 16. Thus the PWM circuit 15 generates the pulse signal for switching on or switching off the transistor 19. When the transistor 19 is switched on, a first current path is formed sequentially through the first output 113, the primary winding 141, the transistor 19, and the resistor 190. A first current I is formed when the first DC voltage provided to the first output 113 is connected to ground via the first current path. The first current I flowing through the first current path linearly increases until electromagnetic induction generated in the primary winding 141 reaches a predetermined maximum threshold.

When the transistor 19 is switched off, the energy stored in the primary winding 141 of the transformer 140 transfers to the secondary winding 143. Thus an AC voltage across the secondary winding 143 is generated. The second rectifying and filtering circuit 12 transforms the AC voltage into the second DC voltage and provides the second DC voltage to the load circuit.

However, because the second DC voltage is generated by second rectifying and filtering circuit 12, a current always flows through the second rectifying diode 124. Since a resistance of the second diode 124 is substantially large, a power consumption of the second diode 124 is correspondingly large which results in a low transform efficiency of the DC to DC converter 10.

It is desired to provide a new DC to DC converter which can overcome the above-described deficiency

SUMMARY

A DC to DC converter includes a first rectifying and filtering circuit configured to receive a AC voltage and transform the AC voltage to a first DC voltage, a PWM circuit, a first transformer configured to receive the first DC voltage and transform the first DC voltage to a second AC voltage under control of the PWM circuit, and a second rectifying and filtering circuit including a first transistor and a control circuit for switching on or switching off the first transistor so as to transform the second AC voltage to a second DC voltage.

Other novel features and advantages will become more apparent from the following detailed description when taken in conjunction with the accompanying drawings.

DETAILED DESCRIPTION

Figure 1:
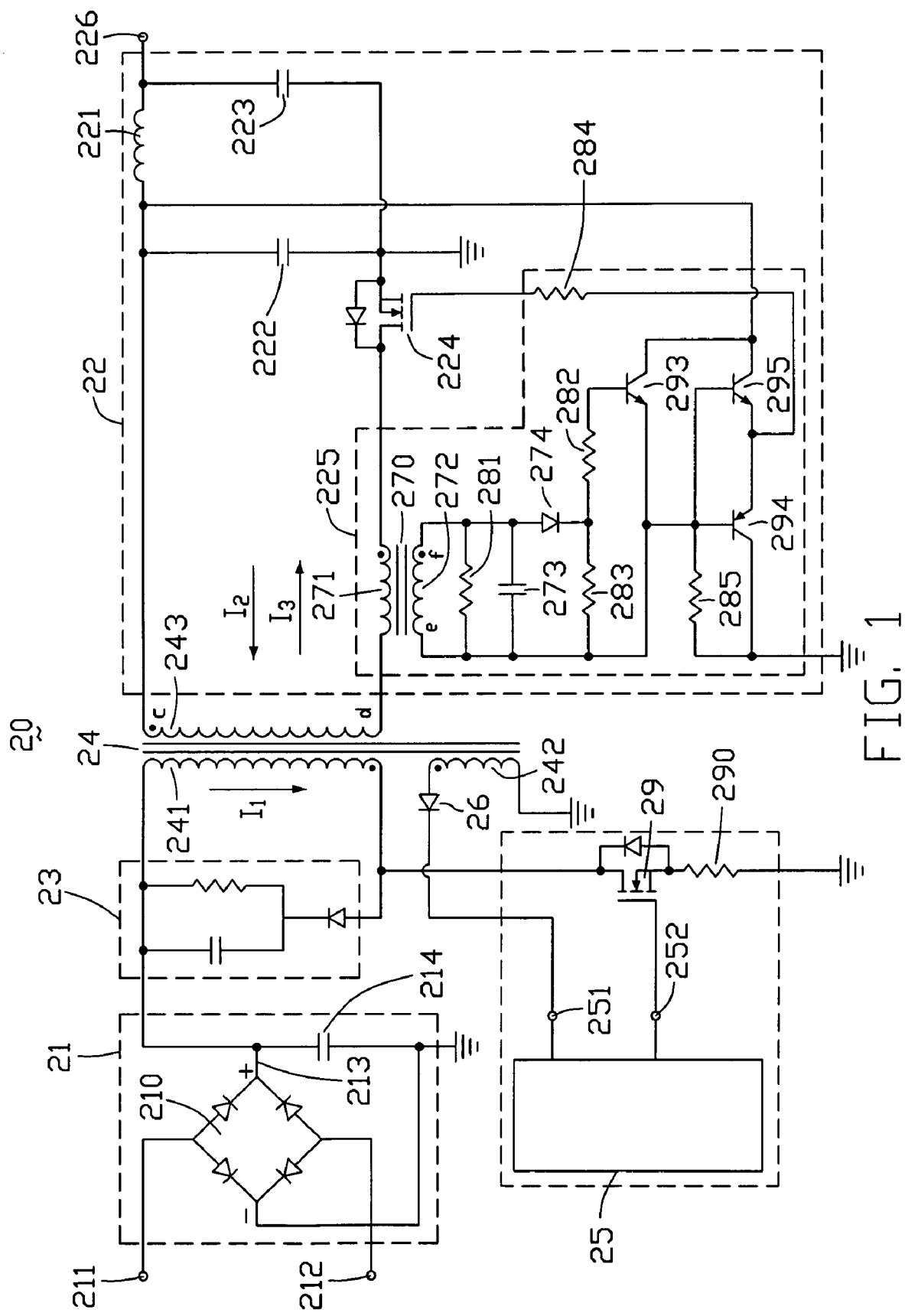
FIG. 1 is a diagram of a first embodiment of a DC to DC converter.

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views. Reference will now be made to the drawings to describe various embodiments in detail.

Referring to FIG. 1, a first embodiment of a DC to DC converter 20 includes a first rectifying and filtering circuit 21, a second rectifying and filtering circuit 22, a protecting circuit 23, a first transformer 24, a PWM circuit 25, a rectifying diode 26, and a first transistor 29. The first transistor 29 is a p-channel metal-oxide-semiconductor field-effect transistor (P-MOSFET).

The PWM circuit 25 includes a voltage input 251 configured to receive an operation voltage and a pulse output 252 configured to provide a pulse signal to a gate electrode of the first transistor 29.

The first rectifying and filtering circuit 21 includes two inputs 211, 212 configured to receive an external alternating current (AC) voltage such as a 220V AC voltage, a full-bridge rectifying circuit 210 configured to convert the 220V AC voltage to a first DC voltage, a first filter capacitor 214 configured to stabilize the first DC voltage, and a first output 213 configured to provide the first DC voltage to the first transformer 24. Two inputs of the full-bridge rectifying circuit 210 serve as the two inputs 211, 212. A positive output of the full-bridge rectifying circuit 210 serves as the first output 213. A negative output of the full-bridge rectifying circuit 210 is connected to ground. The first filter capacitor 214 is connected between the first output 213 and ground.

The first transformer 24 includes a primary winding 241, an assistant winding 242, and a secondary winding 243. The first output 213 of the first rectifying and filtering circuit 21 is connected to ground via the primary winding 241, a drain electrode and a source electrode of the first transistor 29, and a resistor 290 in series. The gate electrode of the first transistor 29 is connected to the pulse output 252 of the PWM circuit 25. The protecting circuit 23 is connected in parallel with the primary winding 241.

One terminal of the assistant winding 242 is connected to ground. The other terminal of the assistant winding 242 is connected to the voltage input 251 of the PWM circuit 25 via the anode and the cathode of the rectifying diode 26 in serials.

The second rectifying and filtering circuit 22 includes an induction coil 221, a storage capacitor 222, a second filter capacitor 223, a second transistor 224, a control circuit 225, and a second output 226 configured to drive a load circuit (not shown). A terminal "c" of the secondary winding 243 is connected to the second output 226 via the induction coil 221, and is connected to ground via the storage capacitor 222. The other terminal "d" of the secondary winding 243 is connected to ground via the control circuit 225 and the second transistor 224 in series. A source electrode of the second transistor 224 is grounded. The second filter capacitor 223 is connected between the second output 226 and ground.

The control circuit 225 includes a second transformer 270, a first resistor 281, a second resistor 282, a third resistor 283, a fourth resistor 284, a fifth resistor 285, a third filter capacitor 273, a protecting diode 274, a third transistor 293, a fourth transistor 294, and a fifth transistor 295.

The second transformer 270 includes a primary winding 271 and a secondary winding 272. The primary winding 271 of the second transformer 270 is connected between the terminal "d" of the secondary winding 243 of the first transformer 24 and a drain electrode of the second transistor 224. The first resistor 281 and the third capacitor 273 are connected in parallel with the secondary winding 272 of the second transformer 270.

The third transistor 293 is an NPN bipolar transistor. A base electrode of the third transistor 293 is connected to a terminal "e" of the secondary winding 272 of the second transformer 270 via the second resistor 282 and the third resistor 283 in series, and is connected to the other terminal "f" of the secondary winding 272 of the second transformer 270 via the second resistor 282 and the inverse protecting diode 274 in series. An emitter electrode of the third transistor 293 is connected to the terminal "e". A collector electrode of the third transistor 293 is connected to the terminal "c" of the secondary winding 243 of the first transformer 24.

The fourth transistor 294 is a PNP bipolar transistor. A base electrode of the fourth transistor 294 is connected to the terminal "e". An emitter electrode of the fourth transistor 294 is connected to a gate electrode of the second transistor 224 via the fourth resistor 284. A collector electrode of the fourth transistor 294 is connected to ground, and is connected to the base electrode of the fourth transistor 294 via the fifth resistor 285.

The fifth transistor 295 is an NPN bipolar transistor. A base electrode of the fifth transistor 295 is connected to the terminal "e". An emitter electrode of the fifth transistor 295 is connected to the emitter electrode of the fourth transistor 294. A collector electrode of the fifth transistor 295 is connected to the collector electrode of the third transistor 293.

In the illustrated embodiment of FIG. 1, one exemplary embodiment is shown and described. Number of turns in the primary and secondary windings of the first transformer 24 are respectively equal to 10 and 1000. A resistance of the first resistor 281 is equal to 1 kilo-ohms. A resistance of the second resistor 282 is equal to 5.1 kilo-ohms. A resistance of the third resistor 283 is equal to 270 ohms. A resistance of the fourth resistor 284 is equal to 100 ohms. A resistance of the fifth resistor 285 is equal to 1 kilo-ohms. A capacitance of the third filter capacitor is equal to 1 nF. It may be understood that resistance and capacitance values of the resistors and/or capacitors of the illustrated embodiment may be changed depending on the embodiment without departing from the spirit of the present disclosure.

The external AC voltage is provided to the two inputs 211, 212 of the first rectifying and filtering circuit 21 and is transformed into the first DC voltage by the first rectifying and filtering circuit 21. Then, the first DC voltage is provided to the primary winding 241. The assistant winding 242 induces the primary winding 241, generates an operation voltage, and provides the operation voltage to the voltage input 251 of the PWM circuit 25 via the rectifying diode 26. Thus the PWM circuit 25 generates the pulse signal for switching on or switching off the transistor 29.

When the transistor 29 is switched on, a first current path is formed sequentially through the first output 213, the primary winding 241 of the first transformer 24, the transistor 29, and the resistor 290. A first current $I_1$ is formed when the first DC voltage provided to the first output 213 is connected to ground via the first current path. Thus a first induction voltage across the secondary winding 243 is generated. A potential at the terminal "d" of the secondary winding 243 of the first transformer 24 is higher than that at the other terminal "c" of the secondary winding 243 of the first transformer 24. Because a parasitic diode (not labeled) inside the second transistor 224 is switched off and no high voltage is provided to the gate electrode of the second transistor 224, the second transistor 224 is switched off and no DC voltage outputs from the second output 226.

When the transistor 29 is switched off, the energy stored in the primary winding 241 of the first transformer 24 is discharged via the protecting circuit 23. Thus, a second induction voltage across the secondary winding 243 is generated. A potential at the terminal "d" of the secondary winding 243 of the first transformer 24 is lower than that at the terminal "c" of the secondary winding 243 of the first transformer 24. Thus the parasitic diode inside the second transistor 224 is switched on. A second current path is formed sequentially through the secondary winding 243 of the first transformer 24, the storage capacitor 222, the second transistor 224, and the primary winding 271 of the second transformer 270.

When a second current $I_2$ flows through the second current path as shown in FIG. 1, a third induction voltage across the secondary winding 272 of the second transformer 270 is generated. A potential at the terminal "f" of the secondary winding 272 of the second transformer 270 is higher than at the other terminal "e" of the secondary winding 272 of the second transformer 270. Thus the third transistor 293 and the fifth transistor 295 are switched on. The fourth transistor 294 is switched off. A high voltage at the terminal "c" provided to the gate electrode of the second transistor 224 via the activated fifth transistor 295. That makes the second transistor 224 switched on. Finally, the second induction voltage is transformed into a second DC voltage and provided to a load circuit via the induction coil 221.

When the first transistor 29 is switched on again, the first current path is formed sequentially through the first output 213, the primary winding 241 of the first transformer 24, the transistor 29, and the resistor 290. The first current $I_1$ is formed when the first DC voltage provided to the first output 213 is connected to ground via the first current path. Thus the first induction voltage across the secondary winding 243 is generated again. A potential at the terminal "d" of the secondary winding 243 of the first transformer 24 is higher than that at the other terminal "c" of the secondary winding 243 of the first transformer 24. Because the second transistor 224 is still in an activated state, a third current $I_3$ is formed and flows through the second current path in an inverse direction according to the direction of the second current $I_2$. When the third current $I_3$ flows through the second current path, a fourth induction voltage across the secondary winding 272 of the second transformer 270 is generated, wherein a potential at the terminal "f" of the secondary winding 272 of the second transformer 270 is lower than that at the terminal "e" of the secondary winding 272 of the second transformer 270.

Thus, the third transistor 293 and the fifth transistor 295 are switched off. The fourth transistor 294 is switched on. The gate electrode of the second transistor 224 is grounded via the fourth resistor 284 and the activated fourth transistor 294 in series. The second transistor 224 is switched off. Finally, the second output 226 outputs no voltage. Number of turns in the secondary winding 243 is larger than that of turns in the primary winding 271.

Because the second rectifying and filtering circuit 12 does not include a rectifying diode and because the internal conducting resistance of the second transistor 224 is substantially low, a transform efficiency of the DC to DC converter 20 is increased.

Figure 2:
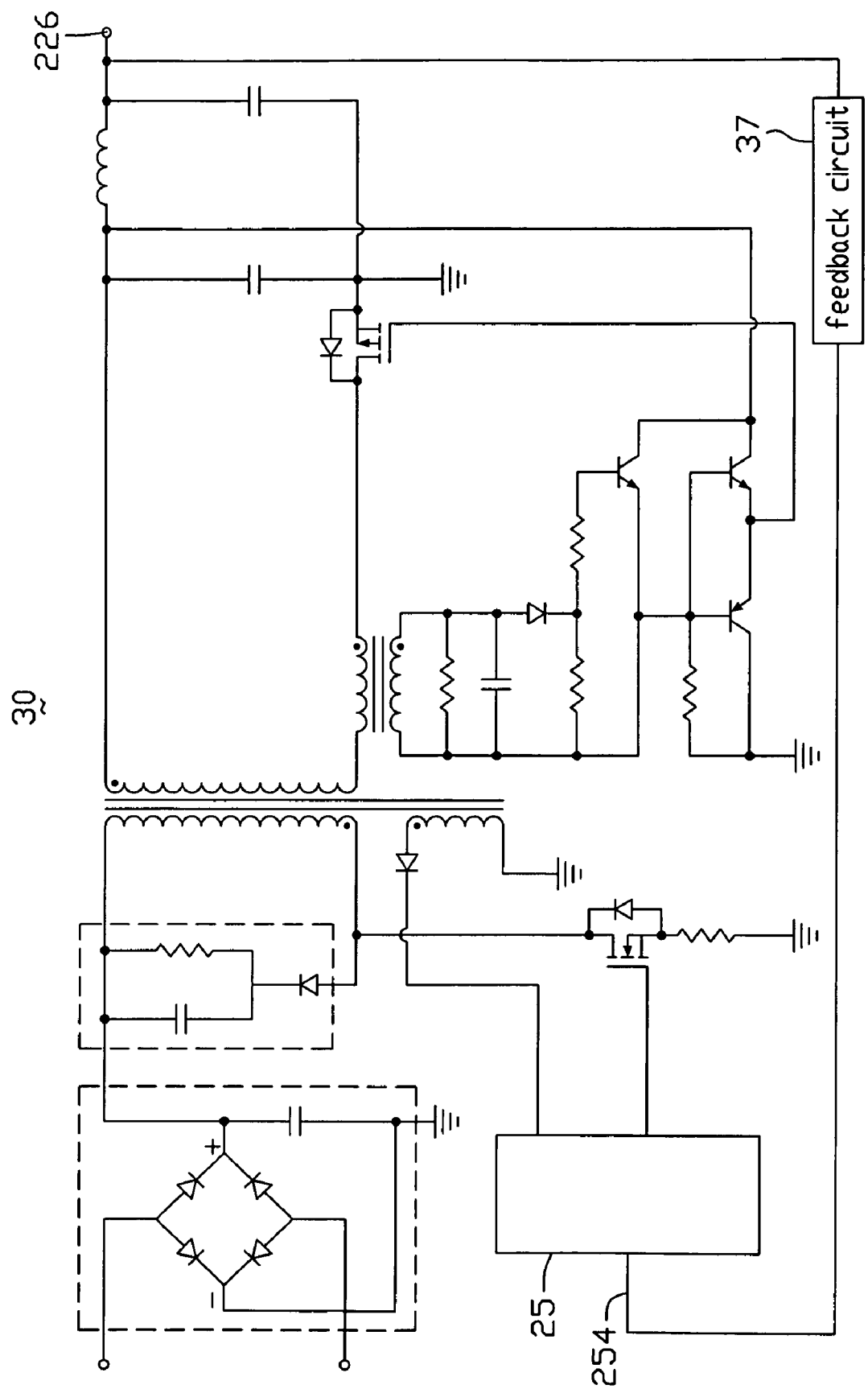
FIG. 2 is a diagram of a second embodiment of a DC to DC converter.
Figure 3:
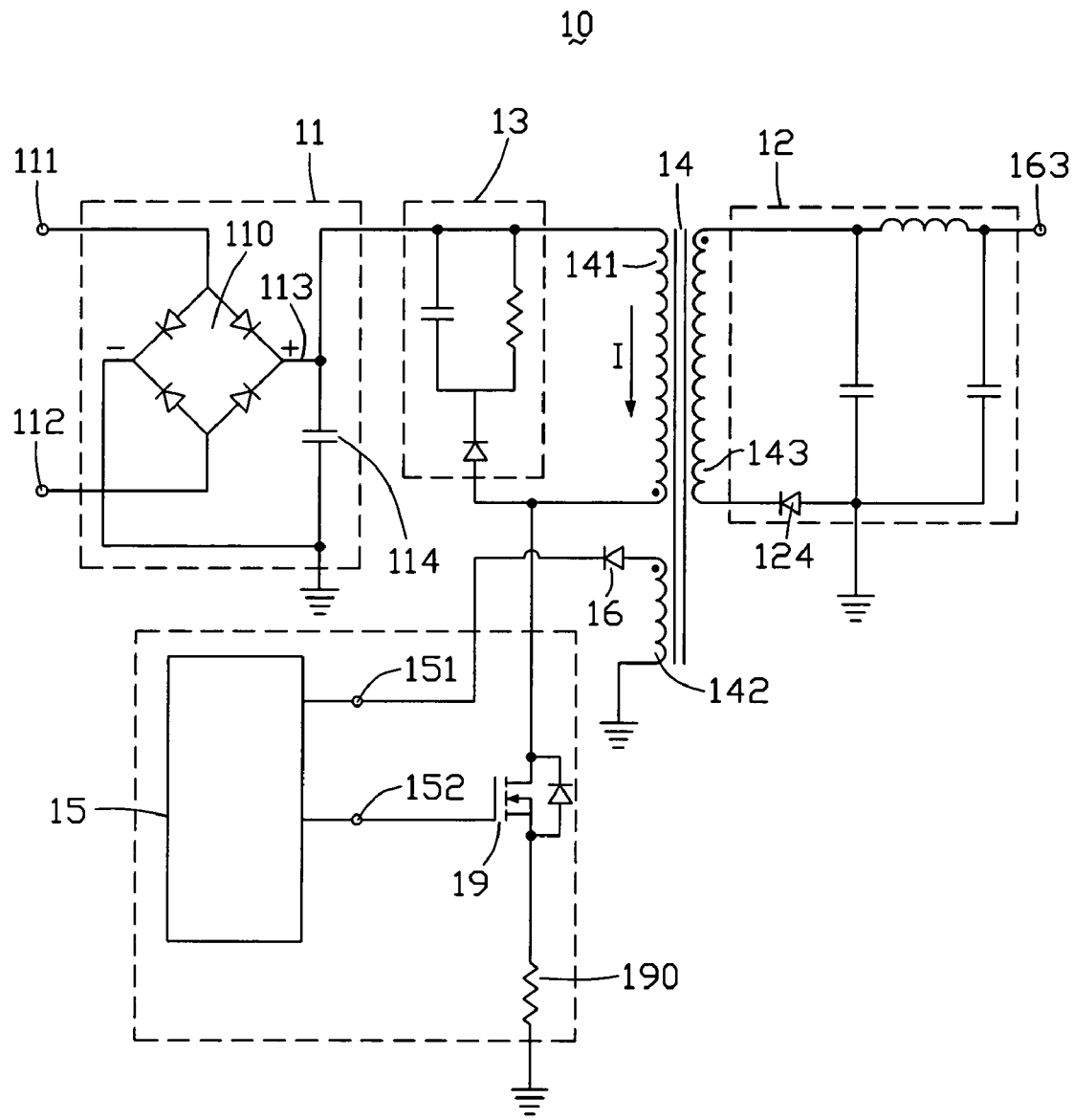
FIG. 3 is a diagram of a typical DC to DC converter.

Referring to FIG. 2, a second embodiment of a DC to DC converter 30 is shown. The DC to DC converter 30 may be substantially similar to the DC to DC converter 20 of FIG. 1, except that the DC to DC converter 30 further includes a feedback circuit 37 connected between the output terminal 226 and an feedback terminal 254 of the PWM IC 25. The PWM IC 25 can adjust a duty ratio of a pulse signal to stabilize the output 226 of the DC to DC converter 30.

In an alternative embodiment, the third and fifth transistors 293, 295 may be an N-MOSFET. The fourth transistor 294 may be a P-MOSFET.

It is to be understood, however, that even though numerous characteristics and advantages of the present disclosure have been set out in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A direct current (DC) to DC converter comprising:
   a first rectifying and filtering circuit configured to receive an alternating current (AC) voltage and transform the AC voltage to a first DC voltage,
   a pulse width modulation (PWM) circuit,
   a first transformer configured to receive the first DC voltage and transform the first DC voltage to a second AC voltage under control of the PWM circuit, and
   a second rectifying and filtering circuit comprising a first transistor, a control circuit for switching on or switching off the first transistor so as to transform the second AC voltage to a second DC voltage, an output terminal configured to output the second DC voltage, and a storage capacitor connected between the output terminal and ground;
   wherein the first transformer comprises a primary winding and a secondary winding, a terminal of the secondary winding being connected to the output terminal, the other terminal of the secondary winding being grounded via the control circuit and the first transistor; and the DC to DC converter further comprising a second transistor connected in series with the primary winding of the first transformer, the PWM circuit being configured to switch on or switch off the second transistor;
   wherein the control circuit comprises a second transformer, a first resistor, a second resistor, a third resistor, a third filter capacitor, a protecting diode, a third transistor, a fourth transistor, and a fifth transistor, the second transformer comprising a primary winding and a secondary winding, the first resistor and the third capacitor being connected in parallel with the secondary winding of the second transformer, a base electrode of the third transistor being connected to a first terminal of the secondary winding of the second transformer via the second resistor and the third resistor in series, and being connected to a second terminal of the secondary winding of the second transformer via the second resistor and the inverse protecting diode in series, an emitter electrode of the third transistor being connected to the first terminal, a collector electrode of the third transistor being connected to a terminal of the secondary winding of the first transformer, a base electrode of the fourth transistor being connected to the first terminal, an emitter electrode of the fourth transistor being connected to the gate electrode of the first transistor, a collector electrode of the fourth transistor being connected to ground, and being connected to a base electrode of the fourth transistor.

2. The DC to DC converter of claim 1, wherein the control circuit further comprises a fourth resistor connected between the emitter electrode of the fourth transistor and the gate electrode of the first transistor.

3. The DC to DC converter of claim 2, wherein the control circuit further comprises a fifth resistor connected between the emitter electrode of the fourth transistor and the base electrode of the fourth transistor.

4. The DC to DC converter of claim 3, wherein the PWM circuit includes a voltage input configured to receive an operation voltage and a pulse output configured to provide a pulse signal to a gate electrode of the second transistor.

5. The DC to DC converter of claim 1, wherein further comprising a feedback circuit connected between the output and the PWM circuit.

6. The DC to DC converter of claim 1, wherein the third transistor and the fifth transistors are NPN transistors and wherein the fourth transistor is a PNP transistor.

7. The DC to DC converter of claim 1, wherein the third and fifth transistors are N-MOSFETs and wherein the fourth transistor is a P-MOSFET.

8. The DC to DC converter of claim 1, wherein a base electrode of the fifth transistor is connected to the first terminal, an emitter electrode of the fifth transistor is connected to the emitter electrode of the fourth transistor, and a collector electrode of the fifth transistor is connected to the collector electrode of the third transistor.

9. A direct current (DC) to DC converter comprising:
a first terminal configured to provide a first DC voltage;
a first transformer comprising a primary winding configured to receive the first DC voltage and a secondary winding configured to output an alternating current (AC) voltage;
a first transistor electrically coupled between the primary winding and ground;
a pulse width modulation (PWM) circuit configured to switch on or switch off the first transistor so as to transform the first DC voltage to the AC voltage; and
a second rectifying and filtering circuit comprising a second transistor and a control circuit for switching on or switching off the second transistor so as to transform the AC voltage to a second DC voltage, the control circuit comprising a second transformer, a first resistor, a second resistor, a third resistor, a third filter capacitor, a protecting diode, a third transistor, a fourth transistor, and a fifth transistor, the second transformer comprising a primary winding and a secondary winding, the primary winding of the second transformer being connected between a terminal of the secondary winding of the first transformer and a drain electrode of the second transistor, a source electrode of the second transistor being grounded, the first resistor and the third capacitor being connected in parallel with the secondary winding of the second transformer, a base electrode of the third transistor being connected to a first terminal of the secondary winding of the second transformer via the second resistor and the third resistor in series, and being connected to a second terminal of the secondary winding of the second transformer via the second resistor and the inverse protecting diode in series, an emitter electrode of the third transistor being connected to the first terminal, a collector electrode of the third transistor being connected to the other terminal of the secondary winding of the first transformer, a base electrode of the fourth transistor being connected to the first terminal, an emitter electrode of the fourth transistor being connected to the gate electrode of the second transistor, a collector electrode of the fourth transistor being connected to ground, and being connected to a base electrode of the fourth transistor, a base electrode of the fifth transistor being connected to the first terminal, an emitter electrode of the fifth transistor being connected to the emitter electrode of the fourth transistor, a collector electrode of the fifth transistor being connected to the collector electrode of the third transistor.

10. The DC to DC converter of claim 9, wherein the second rectifying and filtering circuit further comprises an output terminal configured to output the second DC voltage and a storage capacitor connected between the output terminal and ground.

11. The DC to DC converter of claim 10, wherein the control circuit further comprises a fourth resistor connected between the emitter electrode of the fourth transistor and the gate electrode of the second transistor.

12. The DC to DC converter of claim 11, wherein the control circuit further comprises a fifth resistor connected between the emitter electrode of the fourth transistor and the base electrode of the fourth transistor.

13. The DC to DC converter of claim 12, wherein a terminal of the primary winding of the first transformer is connected to the first terminal, the other terminal is connected to a drain electrode of the first transistor, a source electrode of the first transistor is connected to ground.

14. The DC to DC converter of claim 13, further comprising a rectifying diode, wherein the first transformer further comprises an assistant winding, the PWM circuit includes a voltage input configured to receive an operation voltage and a pulse output configured to provide a pulse signal to a gate electrode of the first transistor, one terminal of the assistant winding is connected to ground, the other terminal of the assistant winding is connected to the voltage input of the PWM circuit via the anode and the cathode of the rectifying diode in serials.

15. The DC to DC converter of claim 14, further comprising a protecting circuit connected in parallel with the primary winding of the first transformer.

16. The DC to DC converter of claim 14, wherein further comprising a feedback circuit connected between the output terminal and the PWM circuit.

17. The DC to DC converter of claim 9, wherein the third transistor and the fifth transistors are NPN transistors and wherein the fourth transistor is a PNP transistor.

18. The DC to DC converter of claim 9, wherein the third and fifth transistors are N-MOSFETs and wherein the fourth transistor is a P-MOSFET.

* * * * *

UNITED STATES PATENT AND TRADEMARK OFFICE
CERTIFICATE OF CORRECTION

PATENT NO. : 7,894,217 B2  
APPLICATION NO. : 12/231484  
DATED : February 22, 2011  
INVENTOR(S) : Huai-Zhu Yan and Tong Zhou It is certified that error appears in the above-identified patent and that said Letters Patent is hereby corrected as shown below:

Title Page;

Please replace Section (73) regarding "Assignees" on the front page of the Patent with the following:

(73) Assignees: Innocom Technology (Shenzhen) Co., Ltd., Shenzhen, Guangdong Province (CN); Chimei Innolux Corporation, Miao-Li County (TW).

Signed and Sealed this  
Seventh Day of June, 2011

David J. Kappos  
*Director of the United States Patent and Trademark Office*